(12) United States Patent
Min (10) Patent No.: US 11,114,684 B2
(45) Date of Patent: Sep. 7, 2021

(54) FUEL CELL MEMBRANE-ELECTRODE ASSEMBLY

(71) Applicant: KOLON INDUSTRIES, INC., Seoul (KR)

(72) Inventor: Myoung-Ki Min, Yongin-si (KR)

(*) Notice: Subject to any disclaimer, the term of this patent is extended or adjusted under 35 U.S.C. 154(b) by 365 days.

(21) Appl. No.: 16/096,801

(22) PCT Filed: Apr. 28, 2017

(86) PCT No.: PCT/KR2017/004602
§ 371 (c)(1),
(2) Date: Oct. 26, 2018

(87) PCT Pub. No.: WO2017/188793
PCT Pub. Date: Nov. 2, 2017

(65) Prior Publication Data
US 2020/0358118 A1   Nov. 12, 2020

(30) Foreign Application Priority Data

Apr. 28, 2016  (KR) .................. 10-2016-0052147
Apr. 28, 2017  (KR) .................. 10-2017-0055486

(51) Int. Cl.
*H01M 8/1004*  (2016.01)
*H01M 4/86*   (2006.01)
*H01M 8/1018*  (2016.01)

(52) U.S. Cl.
CPC ....... *H01M 8/1004* (2013.01); *H01M 4/8657* (2013.01); *H01M 2008/1095* (2013.01)

(58) Field of Classification Search
CPC ....... H01M 2008/1095; H01M 4/8657; H01M 4/8663; H01M 4/8673; H01M 4/9016; H01M 8/1004; Y02E 60/50
See application file for complete search history.

(56) References Cited

U.S. PATENT DOCUMENTS 6,936,370 B1    8/2005  Knights et al.
2003/0057088 A1* 3/2003  Ichikawa .................. C25B 1/04
                                           204/252

(Continued)

FOREIGN PATENT DOCUMENTS

CN   101170175 A   4/2008
CN   103372467 A   10/2013

(Continued)

OTHER PUBLICATIONS

Machine Translation JP2008041411(A) (Year: 2008).*

(Continued)

*Primary Examiner* — Victoria H Lynch
(74) *Attorney, Agent, or Firm* — Harvest IP Law, LLP (57) ABSTRACT

A membrane-electrode assembly for a fuel cell is provided. The membrane-electrode assembly includes a cathode electrode and an anode electrode which are positioned oppositely to each other; and a polymer electrolyte membrane positioned between the cathode electrode and the anode electrode. The cathode electrode and the anode electrode each includes an electrode substrate; a micropore layer which is positioned on the electrode substrate; and a first catalyst layer positioned on the micropore layer, at least one of a second catalyst layer is positioned between the first catalyst layer and the polymer electrolyte membrane, and the second catalyst layer includes a reaction inducing material which is a metal or alloy.

10 Claims, 6 Drawing Sheets

(56) References Cited

U.S. PATENT DOCUMENTS

| | | |
|---|---|---|
| 2007/0218342 A1 | 9/2007 | Han et al. |
| 2007/0231675 A1 | 10/2007 | Son |
| 2013/0022890 A1 | 1/2013 | Kundu et al. |
| 2014/0322631 A1 | 10/2014 | Klose-Schubert et al. |
| 2015/0354072 A1 | 12/2015 | Suchsland et al. |
| 2017/0346101 A1* | 11/2017 | Lee ............... B01J 35/0013 |

FOREIGN PATENT DOCUMENTS

| | | |
|---|---|---|
| CN | 103904341 A | 7/2014 |
| CN | 105144444 A | 12/2015 |
| JP | 2002-025561 A | 1/2002 |
| JP | 2003508877 A | 3/2003 |
| JP | 2005-353408 A | 12/2005 |
| JP | 2007273107 A | 10/2007 |
| JP | 2007-287415 A | 11/2007 |
| JP | 2008004453 A | 1/2008 |
| JP | 2008041411 A | 2/2008 |
| JP | 2009043472 A | 2/2009 |
| JP | 2010092808 A | 4/2010 |
| JP | 10-2016-0008192 A | 1/2016 |
| KR | 10-0658688 B1 | 12/2006 |
| KR | 10-0738062 B1 | 7/2007 |
| KR | 10-2014-0085148 A | 7/2014 |
| WO | 2008/037411 A1 | 4/2008 |

OTHER PUBLICATIONS

Chinese office action issued by China Patent Office dated Nov. 18, 2020.

Vladimir Neburchilov et al., "Low Pt content Pt—Ru—Ir—Sn quaternary catalysts for anodic methanol oxidation in DMFC", Electrochemistry Communications, 2007, pp. 1788-1792, vol. 9, No. 7.

International Search Report for PCT/KR2017/004602, dated Aug. 17, 2017.

Japanese Office Action issued by the Japan Patent Office (JPO) dated Sep. 25, 2020.

\* cited by examiner

FUEL CELL MEMBRANE-ELECTRODE ASSEMBLY

CROSS REFERENCE TO RELATED APPLICATIONS

This Application is a National Stage of International Application No. PCT/KR2017/004602 filed Apr. 28, 2017, claiming priority based on Korean Patent Application No. 10-2016-0052147 filed Apr. 28, 2016 and 10-2017-0055486 filed Apr. 28, 2017.

TECHNICAL FIELD

The present invention relates to a membrane-electrode assembly for a fuel cell.

BACKGROUND ART

A typical example of a fuel cell may include a polymer electrolyte membrane fuel cell (PEMFC), a direct oxidation fuel cell, or the like. A fuel cell using methanol as a fuel in the direct oxidation fuel cell is referred to as a direct methanol fuel cell (DMFC).

The direct oxidation fuel cell has advantages that the direct oxidation fuel cell can be operated at room temperature, and the direct oxidation fuel cell does not particularly require a fuel reformer by facilitating handling of fuel and maintaining a low operation temperature although the direct oxidation fuel cell has a low energy density compared to the PEMFC. The PEMFC has advantages of a high energy density and a high output power.

In these fuel cells, a stack substantially generating electricity has a structure in which several to tens of unit cells comprised of a membrane-electrode assembly (MEA) and a separator (or referred to as a bipolar plate) are stacked. The MEA has a structure in which an anode electrode (alias "a fuel electrode" or "an oxidation electrode") and a cathode electrode (alias "an air electrode" or "a reduction electrode") are positioned with a polymer electrolyte membrane including a hydrogen ion conductive polymer being dispositioned therebetween.

The principle of generating electricity in the fuel cell includes supplying fuel to the anode electrode, i.e., the fuel electrode such that the fuel is adsorbed onto a catalyst of the anode electrode, oxidizing the fuel to generate hydrogen ions and electrons, and enabling the generated electrons to reach the cathode electrode, i.e., the oxidation electrode according to an external circuit, and transferring the generated hydrogen ions to the cathode electrode through the polymer electrolyte membrane. An oxidizer is supplied to the cathode electrode, and the oxidizer, hydrogen ions and electrons are reacted on a catalyst of the cathode electrode to generate electricity while producing water.

When such a fuel cell is used in a car, a gas composition for the anode electrode may be comprised of oxygen and hydrogen during start-up/shut-down or during fuel starvation circumstances, and this becomes a cause of increasing a voltage of the cathode electrode side to 1.6 V or more.

When the voltage of the cathode electrode side is changed into such a high voltage, corrosion may be generated in carbon which is used as a support of a fuel cell catalyst, and corrosion of carbon is rapidly progressed at a voltage of 1 V or higher.

DISCLOSURE

Technical Problem

An embodiment of the present invention provides a membrane-electrode assembly for a fuel cell, the membrane-electrode assembly which improves battery performance by preventing corrosion of the support and improving distribution of water in a low current region, thereby obtaining high activities and stability.

Technical Solution

Furthermore, in this specification, a membrane-electrode assembly for a fuel cell is provided, the membrane-electrode assembly for the fuel cell comprising: a cathode electrode and an anode electrode which are positioned oppositely to each other; and a polymer electrolyte membrane which is positioned between the cathode electrode and the anode electrode, the cathode electrode and the anode electrode each including: an electrode substrate; a micropore layer which is positioned on the electrode substrate; and a first catalyst layer which is positioned on the micropore layer, at least one of a second catalyst layer being positioned between the first catalyst layer and the polymer electrolyte membrane, the second catalyst layer including a reaction inducing material, and the reaction inducing material being a metal or alloy selected from Ir, Ru, $Ir_aRu_b$, $Ir_cRu_dM_e$, $Ir_fM_g$, $Ru_fM_g$, and a combination thereof, or an oxide selected from $IrO_x$, $RuO_x$, $Ir_aRu_bO_x$, $Ir_cRu_dM_eO_x$, $Ir_fM_gO_x$, $Ru_fM_gO_x$, and a combination thereof.

The M is Fe, Co, Mn, Cu, Ni, Zn, Ti, V, Cr, Pd, Ag, Cd, In, Sn, Au, Os, W, Re, Rh or a combination thereof, a ratio of a/b is 0.3 to 3.5, a ratio of c/(d+e) is 0.3 to 3.5, a ratio of d/e is 0.5 to 25, a ratio of f/g is 3 to 20, and x is an integer of 0.5 to 2.

The reaction inducing material may be a three-way catalyst of $Ir_cRu_dM_e$ or $Ir_cRu_dM_eO_x$.

The reaction inducing material may be selected from $Ir_8Ru_2FeO_x$, $IrRuO_x$, $IrRu_2O_x$, $Ir_2RuO_x$, and a combination thereof.

The second catalyst layer may have a thickness of 0.1 to 5 μm.

The second catalyst layer may further include a support which supports the reaction inducing material.

The reaction inducing material may be included in an amount of 20 to 99 wt % with respect to the total amount of the reaction inducing material and the support.

The second catalyst layer may further include an additive selected from $SiO_2$, $TiO_2$, $WO_x$ and $ZrO_2$.

The second catalyst layer may further include a support which supports the reaction inducing material and the additive.

The reaction inducing material and the additive may be included in a total content of 20 to 99 wt % with respect to the total amount of the reaction inducing material, the additive, and the support.

The additive may be included in an amount of 0.5 to 5 wt % with respect to the total amount of the reaction inducing material, the additive, and the support.

The support may include graphite, Denka black, Ketjen black, acetylene black, carbon nanotube, carbon nanofiber, carbon nanowire, carbon nanoball, activated carbon, stabilized carbon, indium tin oxide (ITO), $TiO_2$, WO, $SiO_2$, or a combination thereof.

Specific details of other embodiments are included in the detailed description below.

Advantageous Effects

The present invention can realize a membrane-electrode assembly for a fuel cell, the membrane-electrode assembly which improves battery performance by preventing corrosion of the support and improving distribution of water in the low current region, thereby obtaining high activities and stability.

MODE FOR INVENTION

A membrane-electrode assembly for a fuel cell according to an embodiment of the present invention comprises: a cathode electrode and an anode electrode which are positioned oppositely to each other; and a polymer electrolyte membrane which is positioned between the cathode electrode and the anode electrode, the cathode electrode and the anode electrode each including: an electrode substrate; a micropore layer which is positioned on the electrode substrate; and a first catalyst layer which is positioned on the micropore layer, at least one of a second catalyst layer being positioned between the first catalyst layer and the polymer electrolyte membrane, the second catalyst layer including a reaction inducing material, and the reaction inducing material being a metal or alloy selected from Ir, Ru, $Ir_aRu_b$, $Ir_cRu_dM_e$, $Ir_fM_g$, $Ru_fM_g$, and a combination thereof, or an oxide selected from $IrO_x$, $RuO_x$, $Ir_aRu_bO_x$, $Ir_cRu_dM_eO_x$, $Ir_fM_gO_x$, $Ru_fM_gO_x$, and a combination thereof (the M is Fe, Co, Mn, Cu, Ni, Zn, Ti, V, Cr, Pd, Ag, Cd, In, Sn, Au, Os, W, Re, Rh or a combination thereof, a ratio of a/b is 0.3 to 3.5, a ratio of c/(d+e) is 0.3 to 3.5, a ratio of d/e is 0.5 to 25, a ratio of f/g is 3 to 20, and x is an integer of 0.5 to 2).

Hereinafter, embodiments of the present invention will be described in detail. However, these embodiments are only exemplary, the present invention is not limited thereto, and the present invention will only be defined by the scope of the appended claims.

Unless particularly stated otherwise in the specification, when a portion of a layer, a film, an area, or a plate is "on" other portion, this not only includes when the portion is "directly on" the other portion, but also includes when the portion is positioned in an intermediate another position of the other portion.

A membrane-electrode assembly for a fuel cell according to an embodiment comprises: a cathode electrode and an anode electrode which are positioned oppositely to each other; and a polymer electrolyte membrane which is positioned between the cathode electrode and the anode electrode.

The cathode electrode and the anode electrode each includes: an electrode substrate; a micropore layer which is positioned on the electrode substrate; and a first catalyst layer which is positioned on the micropore layer, wherein at least one of a second catalyst layer is positioned between the first catalyst layer and the polymer electrolyte membrane.

The second catalyst layer includes a reaction inducing material, and the reaction inducing material may be a metal or alloy selected from Ir, Ru, $Ir_aRu_b$, $Ir_cRu_dM_e$, $Ir_fM_g$, $Ru_fM_g$, and a combination thereof, or an oxide selected from $IrO_x$, $RuO_x$, $Ir_aRu_bO_x$, $Ir_cRu_dM_eO_x$, $Ir_fM_gO_x$, $Ru_fM_gO_x$, and a combination thereof.

The M is Fe, Co, Mn, Cu, Ni, Zn, Ti, V, Cr, Pd, Ag, Cd, In, Sn, Au, Os, W, Re, Rh or a combination thereof, a ratio of a/b is 0.3 to 3.5, a ratio of c/(d+e) is 0.3 to 3.5, a ratio of d/e is 0.5 to 25, a ratio of f/g is 3 to 20, and x is an integer of 0.5 to 2.

The membrane-electrode assembly for the fuel cell will be described in more detail below.

Figure 1:
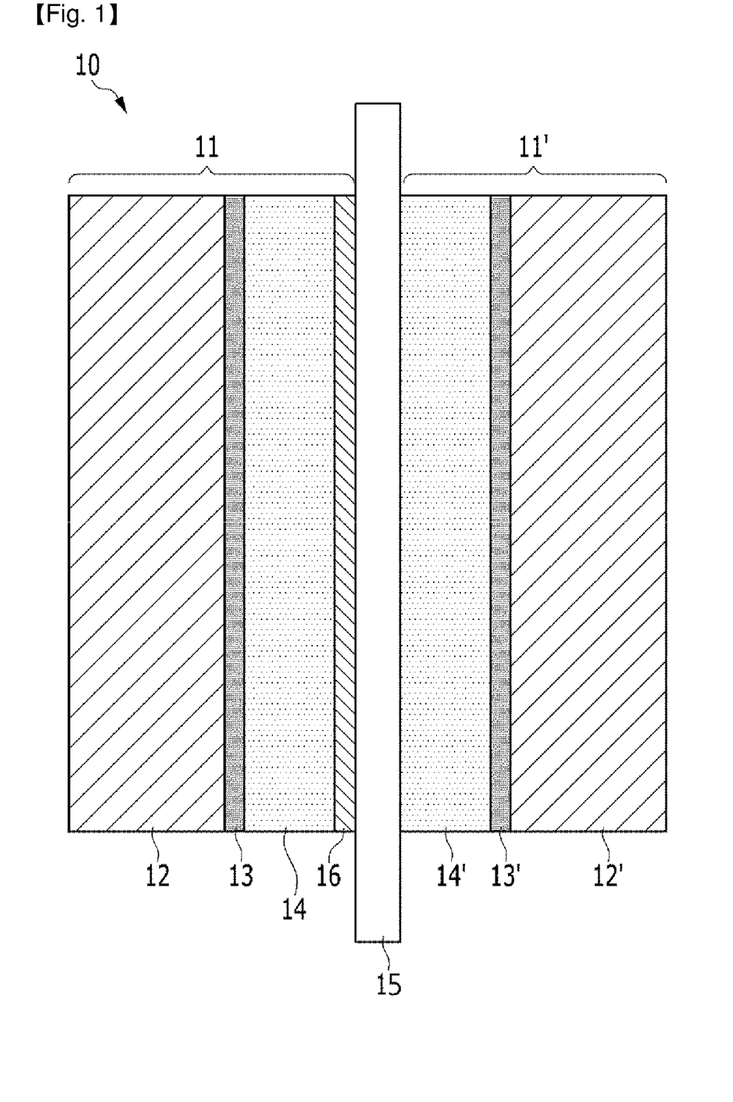
FIG. 1 is a schematic diagram showing a membrane-electrode assembly (MEA) for a fuel cell according to an embodiment.
Figure 2:
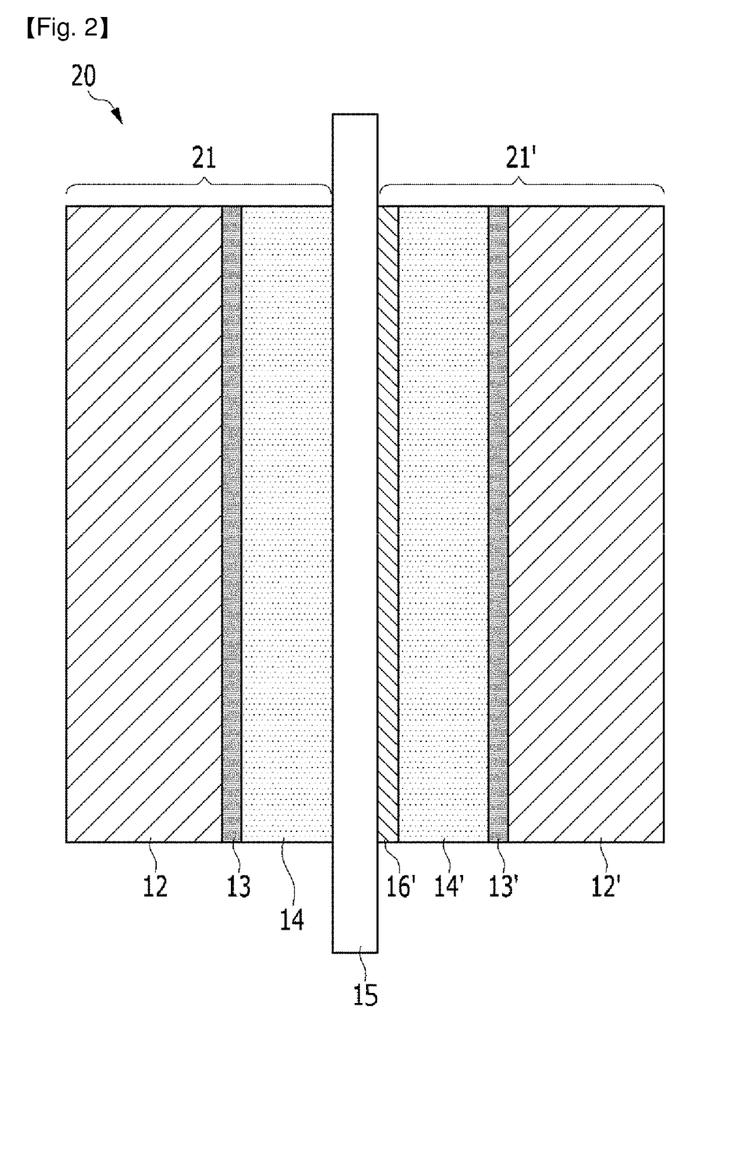
FIG. 2 is a schematic diagram showing a membrane-electrode assembly (MEA) for a fuel cell according to other embodiment.
Figure 3:
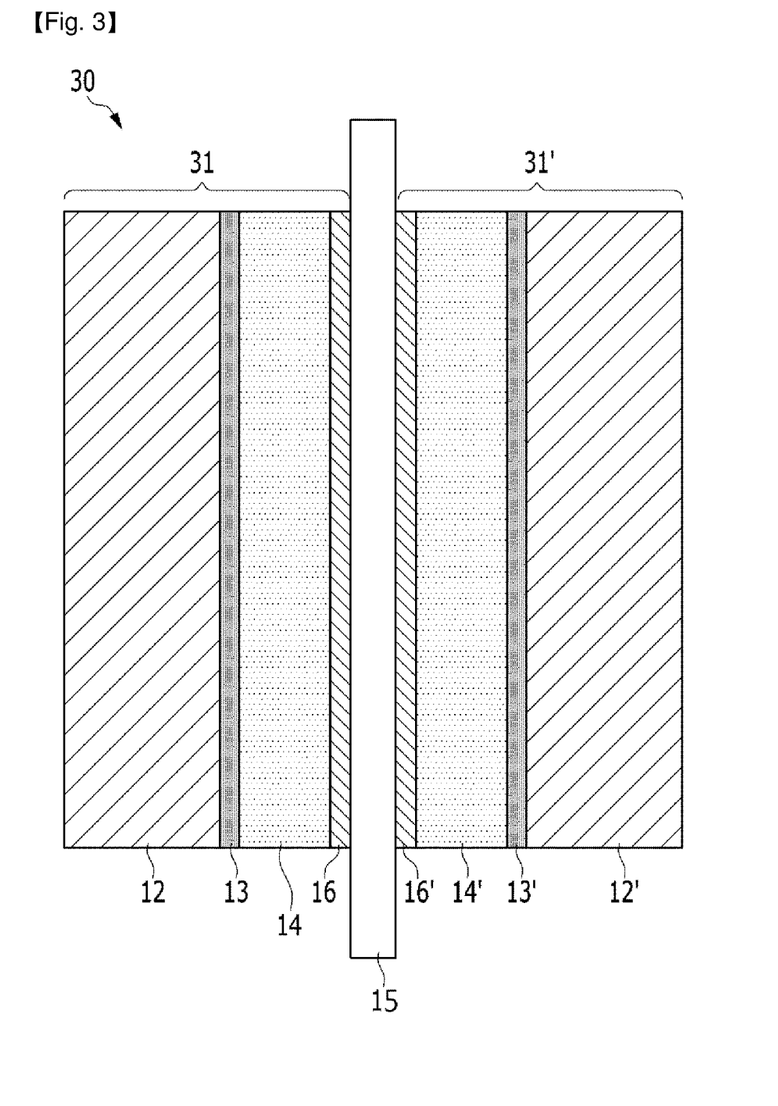
FIG. 3 is a schematic diagram showing a membrane-electrode assembly (MEA) for a fuel cell according to another embodiment.

FIG. 1 to FIG. 3 are schematic diagrams showing membrane-electrode assemblies (MEA) for the fuel cell according to embodiments of the present invention.

This will be explained in more detail as follows referring to FIG. 1 to FIG. 3. Membrane-electrode assemblies 10, 20, 30 for the fuel cell according to embodiments of the present invention comprise: a cathode electrode 11 and an anode electrode 11' which are positioned oppositely to each other; and a polymer electrolyte membrane 15 which is positioned between the cathode electrode 11 and the anode electrode 11', and the cathode electrode 11 and the anode electrode 11' each includes: an electrode substrate 12, 12'; a micropore layer 13, 13' which is positioned on the electrode substrate 12, 12'; and a first catalyst layer 14, 14' which is positioned on the micropore layer 13, 13'.

Referring to FIG. 1, the membrane-electrode assembly 10 for the fuel cell according to an embodiment of the present invention may further comprise a second catalyst layer 16 which is positioned between the first catalyst layer 14 and the polymer electrolyte membrane 15 that are included in the cathode electrode 11.

Referring to FIG. 2, the membrane-electrode assembly 20 for the fuel cell according to other embodiment of the present invention may further comprise a second catalyst layer 16' which is positioned between the first catalyst layer 14' and the polymer electrolyte membrane 15 that are included in the anode electrode 21'.

Referring to FIG. 3, the membrane-electrode assembly 30 for the fuel cell according to another embodiment of the present invention may further comprise a second catalyst layer 16, 16' which is positioned between the first catalyst layer 14, 14' and the polymer electrolyte membrane 15 that are included in the cathode electrode 31 and the anode electrode 31'.

The second catalyst layer 16, 16' includes a reaction inducing material, and the reaction inducing material may be a metal or alloy selected from Ir, Ru, $Ir_aRu_b$, $Ir_cRu_dM_e$, $Ir_fM_g$, $Ru_fM_g$, and a combination thereof, or an oxide selected from $IrO_x$, $RuO_x$, $Ir_aRu_bO_x$, $Ir_cRu_dM_eO_x$, $Ir_fM_gO_x$, $Ru_fM_gO_x$, and a combination thereof.

Durability against corrosion of a support may be improved by positioning the second catalyst layer 16 including the reaction inducing material between the first catalyst layer 14 and the polymer electrolyte membrane 15 that are included in the cathode electrode 11, 31 according to an embodiment of the present invention, thereby maintaining high water decomposition activities and high voltage stability.

Further, a reaction of generating hydrogen and oxygen by decomposing water at a high voltage, e.g., an oxygen evolution reaction (OER) may be induced and accelerated. Accordingly, corrosion is generated in a support such as carbon as voltage at the side of the cathode electrode 11, 31 is increased during start-up, shut-down or fuel starvation of a car. Corrosion of the support may be relieved or prevented since water decomposition occurs instead of corrosion of the support at a high voltage when many oxygen evolution reactions occur.

A degradation phenomenon of consistently oxidizing a carbon support of a platinum catalyst in a high electric potential region occurs in electrodes of the membrane-electrode assemblies 10, 20, 30 under driving conditions of a hydrogen fuel cell vehicle. This is so because the carbon support is thermodynamically instable in operating conditions of a polymer electrolyte membrane fuel cell (PEMFC) such that the carbon support is corroded as in the following Formula (1):

$$C+2H_2O \rightarrow CO_2+4H^++4e^- \quad \text{Formula (1)}$$

Although it is known that the above oxidation reaction is generally slowly progressed, a problem that catalytic performance is rapidly decreased as degradation is further accelerated when a high electric potential is applied to the membrane-electrode assemblies 10, 20, 30. a corrosion phenomenon of the support can be prevented by using an oxidation evolution reaction (OER) catalyst which generates oxygen by decomposing water produced through an electrochemical reaction to solve this problem, thereby decomposing water in advance before the carbon support is corroded in the high electric potential region (see Formula (2)).

$$2H_2O \rightarrow 4e^-+4H^++O_2 \quad \text{Formula (2)}$$

Examples of the oxygen evolution reaction (OER) catalyst include Ir, Ru, $Ir_aRu_b$, $Ir_cRu_dM_e$, $Ir_fM_g$, $Ru_fM_g$, $IrO_x$, $RuO_x$, $Ir_aRu_bO_x$, $Ir_cRu_dM_eO_x$, $Ir_fM_gO_x$, and $Ru_fM_gO_x$.

Although $RuO_x$ can be easily used as the oxygen evolution reaction (OER) catalyst, $RuO_x$ has a problem that it is easily decomposed in an acid atmosphere and at a high voltage. On the other hand, since the above problem is not generated in $Ir_cRu_dM_e$ or $Ir_cRu_dM_eO_x$, i.e., a ternary alloy oxygen evolution reaction (OER) catalyst including $RuO_x$ and $IrO_x$ all together, $Ir_cRu_dM_e$ or $Ir_cRu_dM_eO_x$ can be more preferably used, and both activities and stability can be improved by using $Ir_cRu_dM_e$ or $Ir_cRu_dM_eO_x$.

Meanwhile, it is known that a large quantity of water is produced by enabling the electrochemical reaction to be actively generated in an interface at which the polymer electrolyte membrane 15 and an electrode meet within the membrane-electrode assemblies 10, 20, 30. At this time, the carbon support exhibits a phenomenon that the carbon support is more severely corroded due to the produced water.

However, a corrosion phenomenon of the support due to the produced water can be inhibited by positioning the second catalyst layer 16' including the reaction inducing material according to other embodiment of the present invention between the first catalyst layer 14' and the polymer electrolyte membrane 15 that are included in the anode electrode 21', 31'.

In comparison, although a catalyst layer manufactured by simply mixing the oxygen evolution reaction (OER) catalyst has an effect of simply inhibiting a corrosion phenomenon of the support due to a water decomposition reaction, the catalyst layer serves as a resistance component against ion transfer required in the electrochemical reaction within the membrane-electrode assemblies 10, 20, 30, thereby generating a problem of lowering output performance of the membrane-electrode assemblies 10, 20, 30.

The collapse of an anode catalyst layer (the first catalyst layer) 14, 14' due to cell-reversal which may be generated during low-temperature starting of a vehicle can be prevented by positioning the second catalyst layer 16' including the reaction inducing material according to other embodiment of the present invention between the first catalyst layer 14' and the polymer electrolyte membrane 15 which are included in the anode electrode 21', 31'.

Further, the collapse of the anode catalyst layer 14, 14' due to an instantaneous fuel starvation can be prevented.

That is, although a large amount of current is required when the anode electrode 21', 31' is started in a frozen state, the anode electrode 21', 31' cannot obtain as much as a required amount of current since water is insufficient or in a frozen state. At this time, corrosion of the support occurs since the required amount of current is replenished by oxidizing a support such as carbon in the anode catalyst layer 14, 14'.

At this time, the anode catalyst layer 14, 14' can become safe by positioning the second catalyst layer 16', thereby enabling the reaction inducing material in the second catalyst layer 16' to decompose water instead of carbon in the anode electrode 21', 31' such that the current is replenished.

On the other hand, hydrogen crossover can be prevented, and the generation of $H_2O_2$ which accelerates degradation of the polymer electrolyte membrane 15 can be inhibited by positioning the second catalyst layer 16, 16' according to an embodiment of the present invention in front of the polymer electrolyte membrane 15 separately from the first catalyst layer 14, 14'.

Further, performances of the membrane-electrode assemblies 10, 20, 30 can be improved by improving water distribution at a side near the polymer electrolyte membrane 15 in the low current region since the reaction inducing material in the second catalyst layer 16, 16' has excellent properties of containing water.

Since the second catalyst layer 16, 16' can be easily formed by the same method as that of the first catalyst layer 14, 14', e.g., a transfer coating method also in the manufacturing method aspect, the second catalyst layer 16, 16' can be manufactured by transferring the reaction inducing material onto the first catalyst layer 14, 14' or the polymer electrolyte membrane 15 without considering the extent of a change in slurry viscosity or ionomer/carbon (I/C) ratio that may be caused by adding the reaction inducing material.

An atomic ratio of Ir and Ru, i.e., a ratio of a/b or a ratio of c/(d+e) may be 0.3 to 3.5, and specifically 0.5 to 2. Further, an atomic ratio of Ru and M, i.e., a ratio of d/e is 0.5 to 25, and an atomic ratio of Ir or Ru and M, i.e., a ratio of f/g may be 3 to 20.

Battery performance can be improved by having high water decomposition activities and excellent stability at a high voltage when using oxides in which the above-mentioned atomic ratios have compositions within the ranges as a catalyst for the fuel cell.

Further, x may be an integer of 0.5 to 2, and specifically 1 to 2. When x satisfies an integer within the range, stable performance can be shown without changing water decomposition activities at a high voltage.

Examples of a form of the oxides may include a nanoparticle, a nanorod, a core-shell, or a combination thereof. The oxides having the above-mentioned form may have a high dispersibility.

An average particle diameter (D50) of the oxides may be 1 to 6 nm, and specifically 2 to 5 nm. High activities can be obtained using small amounts of oxides as dispersibility is further improved when the average particle diameter of the oxides is within the range.

Further, for example, the reaction inducing material may be selected from $Ir_8Ru_2FeO_x$, $IrRuO_x$, $IrRu_2O_x$, $Ir_2RuO_x$, and a combination thereof.

Thickness of the second catalyst layer 16, 16' may be 0.1 to 5 μm, specifically 0.1 to 3 μm, and most specifically 0.1 to 2 μm. When the thickness of the second catalyst layer 16, 16' is within the range, performances of the membrane-electrode assemblies 10, 20, 30 can be improved by improving durability against support corrosion without decreasing performance of the catalyst layer, and improving water distribution at a side near the polymer electrolyte membrane 15 in the low current region.

The second catalyst layer 16, 16' may further include a support of supporting the reaction inducing material. In other words, the reaction inducing material may be used alone, and the reaction inducing material may be further used in a form that the reaction inducing material is supported on the support. For example, the form that the reaction inducing material is supported on the support selected from both forms may be used in the aspect of increasing dispersibility of the catalyst.

Examples of the support may include graphite, Denka black, Ketjen black, acetylene black, carbon nanotube, carbon nanofiber, carbon nanowire, carbon nanoball, activated carbon, stabilized carbon, indium tin oxide (ITO), $TiO_2$, WO, $SiO_2$, or a combination thereof.

The stabilized carbon may be formed by heat-treating Ketjen black at 1500 to 3000° C., e.g., 2000 to 2800° C. The stabilized carbon may have a surface area of 50 to 700 $m^2/g$, e.g., 70 to 400 $m^2/g$.

The reaction inducing material may be included in an amount of 20 to 99 wt %, e.g., 30 to 80 wt % or 30 to 70 wt % with respect to the total amount of the reaction inducing material and the support. Dispersibility of the catalyst can be improved while securing high stability when the reaction inducing material is supported within the content range.

The second catalyst layer 16, 16' may further include an additive selected from $SiO_2$, $TiO_2$, $WO_N$, and $ZrO_2$ besides the reaction inducing material.

The additive may contain water, and may serve as a water decomposition reaction initiator.

The additive may be included in an amount of 0.5 to 5 wt %, and specifically 1 to 3 wt % with respect to the total amount of the reaction inducing material, the additive, and the support. Corrosion of the support can be further prevented while securing high activity and stability of the fuel cell catalyst by initiating the water decomposition reaction at a lower voltage when the additive is included within the content range.

The second catalyst layer 16, 16' may be used as the reaction inducing material or the additive itself, and may be used in a form that the second catalyst layer 16, 16' is supported on the support.

The second catalyst layer 16, 16' is manufactured by a method as described below.

The second catalyst layer 16, 16' may be manufactured by using the method comprising: mixing an iridium precursor, a ruthenium precursor and optionally a metal (M) precursor selected from Fe, Co, Mn, Cu, Ni, Zn, Ti, V, Cr, Pd, Ag, Cd, In, Sn, Au, Os, W, Re, Rh, or a combination thereof such that an Ir/(Ru+M) atomic ratio becomes 0.3 to 3.5; optionally enabling a support to be additionally mixed with a precursor mixture; adding $SiO_2$ to the support-mixed precursor mixture to obtain a mixture; primarily heat-treating the mixture to obtain a primarily heat-treated mixture; secondly heat-treating the primarily heat-treated mixture to obtain a secondly heat-treated mixture; and removing at least a portion of $SiO_2$ from the secondly heat-treated mixture.

The iridium precursor may include chloroiridic acid ($H_2IrCl_6$) or the like, the ruthenium precursor may include ruthenium trichloride ($RuCl_3$) or the like, and the metal precursor may include iron(III) nitrate nonahydrate (Fe $(NO_3)_3.9H_2O$) or the like.

The first heat treatment may be performed at a temperature of 150 to 500° C., e.g., 200 to 400° C. under a hydrogen atmosphere. Further, the second heat treatment may be performed at a temperature of 200 to 500° C., and specifically 225 to 300° C. under an air atmosphere.

Removal of SiO2 may be performed by using a base such as NaOH, KOH or the like, or a HF acid.

An active material may also be used together with the reaction inducing material in addition to the above-mentioned reaction inducing material.

The active material may include a metal.

The metal may specifically include a platinum-based metal. Specifically, the platinum-based metal may include platinum, ruthenium, osmium, a platinum-M alloy (M is at least one metal selected from Ga, Ti, V, Cr, Mn, Fe, Co, Ni, Cu, Zn, Sn, Mo, W, Rh, Ru, Os and Pd), or a combination thereof. More specifically, the platinum-based metal may include Pt, a Pt—Ru alloy, a Pt—W alloy, a Pt—Ni alloy, a Pt—Sn alloy, a Pt—Mo alloy, a Pt—Pd alloy, a Pt—Fe alloy, a Pt—Cr alloy, a Pt—Co alloy, a Pt—Co—Ni alloy, a Pt—Co—Fe alloy, a Pt—Co—S alloy, a Pt—Fe—S alloy, a Pt—Co—P alloy, a Pt—Fe—Ir alloy, Pt—Co—Ir alloy, a Pt—Cr—Ir alloy, a Pt—Ni—Ir alloy, a Pt—Au—Co alloy, a Pt—Au—Fe alloy, a Pt—Au—Ni alloy, a Pt—Ru—W alloy, a Pt—Ru—Mo alloy, a Pt—Ru—V alloy, a Pt—Ru—Rh—Ni alloy, a Pt—Ru—Sn—W alloy, or a combination thereof.

The active material may further include a support which supports the metal. In other words, the metal as the active material may be used alone, or in a form that the metal is supported on the support.

The support may include graphite, Denka black, Ketjen black, acetylene black, carbon nanotube, carbon nanofiber, carbon nanowire, carbon nanoball, activated carbon, stabilized carbon, indium tin oxide (ITO), $TiO_2$, WO, $SiO_2$, or a combination thereof.

When the metal is used in the form that the metal is supported on the support, the metal may be included in an amount of 10 to 80 wt %, specifically 20 to 65 wt % with respect to the total amount of the metal and the support. When the metal is supported within the above-mentioned content range, a fuel cell with high activity can be secured, and manufacturing of the catalyst layer is also facilitated.

The reaction inducing material may be included in an amount of 0.5 to 10 parts by weight, e.g., 1 to 7.5 parts by weight with respect to the active material, specifically 100 parts by weight of the total amount of the metal and the support. When the reaction inducing material is included within the above-mentioned content range, a catalyst for the fuel cell having excellent stability at a high voltage through high water decomposition activity can be secured, and a high activity can be obtained without deteriorating performances of existing membrane-electrode assemblies 10, 20, 30 even with a small amount of precious metal.

The electrode substrate 12, 12' serves to support electrodes, and serves to help the fuel and oxidizer easily approach the catalyst layer by diffusing fuel and oxidizer into the first catalyst layer 14, 14'.

The electrode substrate 12, 12' includes a conductive substrate, and specifically may include carbon paper, carbon cloth, carbon felt or metal cloth (refers to a porous film formed of metal cloth in a fiber state, or a metal film formed on the surface of cloth formed of a polymer fiber). However, the electrode substrate 12, 12' is not limited thereto.

The electrode substrate 12, 12' may include an electrode substrate on which a water-repellent treatment is performed using a fluorine-based resin. In this case, the electrode substrate 12, 12' can prevent a drop in diffusion efficiency of a reactant due to water generated during driving of the fuel cell.

The fluorine-based resin may include polytetrafluoroethylene, polyvinylidene fluoride, polyhexafluoropropylene, polyperfluoroalkyl vinyl ether, polyperfluorosulfonyl fluoride, alkoxyvinyl ether, fluorinated ethylene propylene, polychlorotrifluoroethylene, or a copolymer thereof.

The electrode substrate 12, 12' has the micropore layer 13, 13' positioned thereon.

The micropore layer 13, 13' serves to enhance a diffusion effect of the reactant in the electrode substrate 12, 12'.

The micropore layer 13, 13' may include a conductive powder which generally has a small particle diameter, e.g., carbon powder, carbon black, acetylene black, activated carbon, carbon fiber, fullerene, carbon nanotube, carbon nanowire, carbon nano-horn, or carbon nano ring.

The micropore layer 13, 13' has a first catalyst layer 14, 14' positioned thereon.

The first catalyst layer 14, 14' includes a catalyst which catalytically helps related reactions (oxidation of the fuel and reduction of the oxidizer).

The catalyst may include any materials which are participated in a reaction of the fuel cell and can be used as the catalyst, and may specifically include a platinum-based catalyst. The platinum-based catalyst may include a catalyst selected from the group consisting of platinum, ruthenium, osmium, a platinum-ruthenium alloy, a platinum-osmium alloy, a platinum-palladium alloy, a platinum-M alloy (M is a transition metal selected from the group consisting of Ga, Ti, V, Cr, Mn, Fe, Co, Ni, Cu, Zn, Sn, Mo, Ru, W, Rh, Ru, and a combination thereof), and a mixture thereof. Accordingly, although it is fine to use the same material in anode electrode 11', 21', 31' and cathode electrodes 11, 21, 31, a platinum-ruthenium alloy catalyst is more preferable as an anode electrode catalyst to prevent the catalyst poisoning phenomenon as a catalyst poisoning phenomenon occurs due to CO generated during an anode electrode reaction in the direct oxidation fuel cell. A specific example of the platinum-ruthenium alloy catalyst may include a catalyst selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and a combination thereof.

Further, such a catalyst may be used as a catalyst itself (black), or may be used in a form that the catalyst is supported on the support. The support is as described above.

Further, the first catalyst layer 14, 14' may further include an ionomer for improving adhesive strength of the catalyst layer and transferring hydrogen ions.

The ionomer may include a polymer resin having hydrogen ion conductivity, specifically all polymer resins having at least one cation exchange group selected from a sulfonic acid group, a carboxylic acid group, a phosphoric acid group, a phosphonic acid group and a derivative thereof in a side chain thereof. More specifically, the ionomer may include at least one polymer resin selected from a fluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone based polymer, and a polyphenylquinoxaline-based polymer. More specifically, the ionomer may include at least one polymer resin selected from poly(perfluorosulfonic acid), poly(perfluorocarboxylic acid), a tetrafluoroethylene/fluorovinylether copolymer including a sulfonic acid group, polyetherketone sulfide, aryl ketone, poly(2,2'-m-phenylene)-5,5'-bibenzimidazole, and poly(2,5-benzimidazole).

The polymer resin having hydrogen ion conductivity enables H to be substituted with Na, K, Li, Cs or tetrabutylammonium in a cation exchange group at the terminal end of the side chain. H is substituted using NaOH during preparation of a catalyst composition when substituting H with Na in the cation exchange group at the terminal end of the side chain, H is substituted using tetrabutylammonium hydroxide when substituting H with tetrabutylammonium, and K, Li or Cs can be substituted using an appropriate compound. Since such a substitution method is well-known in this related field, a detailed description thereof is omitted.

The ionomer may be used singularly or in a combination, and the ionomer may be selectively used along with a non-conductive compound to further improve adhesive strength with the polymer electrolyte membrane 15. The non-conductive compound may be used in a controlled amount depending on the purpose.

The non-conductive compound may include at least one selected from polytetrafluoroethylene (PTFE), tetrafluoroethylene-hexafluoropropylene copolymer (FEP), tetrafluoroethylene-perfluoroalkyl vinyl ether copolymer (PFA), ethylene tetrafluoroethylene (ETFE), ethylene-chlorotrifluoroethylene copolymer (ECTFE), polyvinylidene fluoride, poly(vinylidene fluoride-hexafluoropropylene) (PVDF-HFP) copolymer, dodecyl benzene sulfonic acid, and sorbitol.

The ionomer may be included in an amount of 15 to 50 wt %, specifically 20 to 40 wt % with respect to the total amount of the catalyst layer. When the ionomer is included within the above-mentioned range, adhesive strength of the catalyst layer is improved, and transfer efficiency of the hydrogen ions is increased.

The polymer electrolyte membrane 15 is positioned between the cathode electrodes 11, 21, 31 and the anode electrodes 11', 21', 31'.

The polymer electrolyte membrane 15, as a solid polymer electrolyte having a thickness of 10 to 200 μm, has an ion exchange function of moving hydrogen ions generated in catalyst layers of the anode electrodes 11', 21', 31' to catalyst layers of the cathode electrodes 11, 21, 31.

The polymer electrolyte membrane 15 is generally used as a polymer electrolyte membrane in the fuel cell, and may include any membrane which is formed of a polymer resin having hydrogen ion conductivity. A specific example of the polymer electrolyte membrane 15 may include a polymer resin having at least one cation exchange group selected from a sulfonic acid group, a carboxylic acid group, a phosphoric acid group, a phosphonic acid group, and a derivative thereof at its side chain.

A specific example of the polymer resin may include at least one selected from a fluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone based polymer, and a polyphenylquinoxaline-based polymer. A more specific example of the polymer resin may include at least one selected from poly (perfluorosulfonic acid) (commercially available as "NAFION"), poly(perfluorocarboxylic acid), a tetrafluoroethylene/fluorovinylether copolymer including a sulfonic acid group, defluorinated polyetherketone sulfide, aryl ketone, poly(2,2'-m-phenylene)-5,5'-bibenzimidazole, and poly(2,5-benzimidazole).

The fuel cell includes a stack which generates electric energy by performing an electrochemical reaction of a hydrogen gas and an oxidizer that are supplied. The stack is described with reference to FIG. 4.

Figure 4:
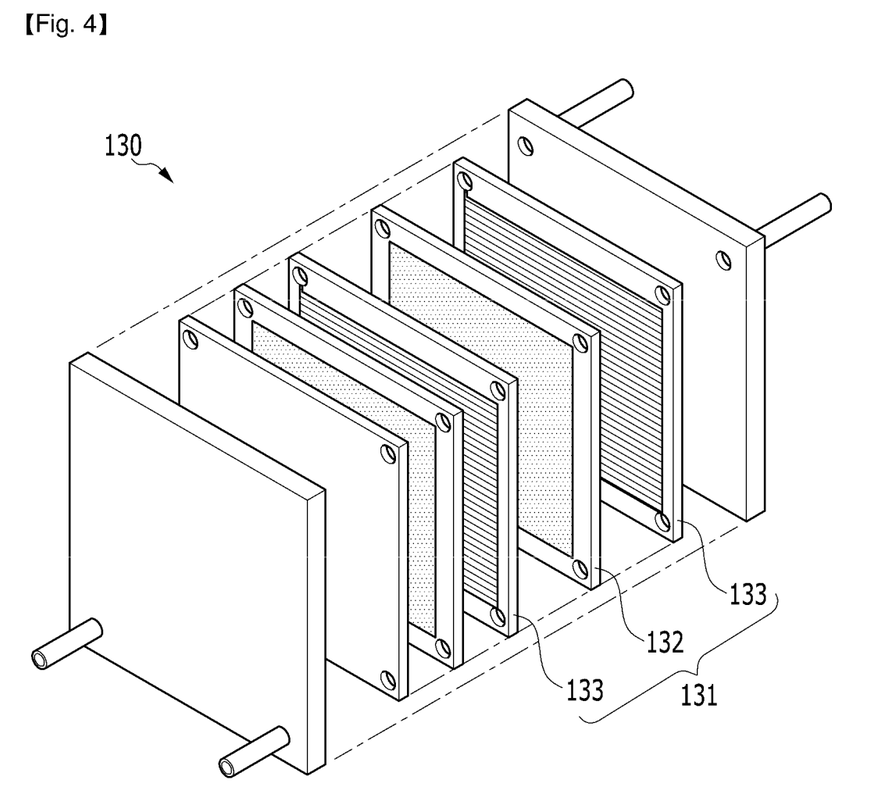
FIG. 4 is a disassembled perspective view illustrating a stack of the fuel cell according to an embodiment.

FIG. 4 is a disassembled perspective view illustrating a stack of the fuel cell according to an embodiment.

Referring to FIG. 4, the stack 130 includes a plurality of unit cells 131 which generate electric energy by inducing an oxidation/reduction reaction of the hydrogen gas and oxidizer that are supplied.

The unit cells 131, which mean cells of units which generate electricity, each include a membrane-electrode assembly 132 which oxidizes or reduces the hydrogen gas and oxygen in the oxidizer, and a separator (or referred to as a bipolar plate) 133 for supplying the hydrogen gas and oxidizer to the membrane-electrode assembly 132. The membrane-electrode assembly 132 is the same as described above. The separator 133 is disposed at both sides of the membrane-electrode assembly 132 such that the membrane-electrode assembly 132 is interposed between the separators 133. At this time, the separators 133 which are each positioned at the outermost sides of the stack 130 may be particularly referred to as end plates.

One end plate of the separators 133 includes a pipe-shaped first supply pipe for injecting the hydrogen gas supplied and a pipe-shaped second supply pipe for injecting oxygen gas. The other end plate of the separators 133 includes a first discharge pipe for discharging the hydrogen gas that has finally been unreacted and remained in a plurality of unit cells 131 to the outside and a second discharge pipe for discharging the oxidizer that has finally been unreacted and remained in the unit cells 131 to the outside.

Hereinafter, a preferred embodiment will be provided for illustrating the present invention. The following Examples are provided to understand the present invention more easily, but the present invention is not limited to the Examples.

Example 1

(Manufacturing a First Catalyst Layer)

A first catalyst (Tanaka Kikinzoku Kogyo TEC36F52) having 52 wt % of a $Pt_3Co$ alloy supported on 48 wt % of carbon was prepared.

A first catalyst layer composition was prepared by mixing 65 wt % of the first catalyst with 35 wt % of Nafion (DuPont Company).

A first catalyst layer was manufactured by coating the first catalyst layer composition on a fluorinated ethylene propylene (FEP) film and sufficiently drying the first catalyst layer composition coated on the FEP film at a temperature of 90° C. in a convection oven for 5 hours, and the first catalyst layer was used as a cathode catalyst layer forming a cathode electrode and an anode catalyst layer forming an anode electrode.

(Manufacturing a Second Catalyst Layer)

A second catalyst consisting of 94 wt % of $Ir_8Ru_2FeO_x$ ($0.5 \leq x \leq 2$) and 6 wt % of $SiO_2$ was manufactured by adding 80 wt % of $SiO_2$ to 20 wt % of a mixture obtained by mixing chloroiridic acid ($H_2IrCl_8$), ruthenium trichloride ($RuCl_3$) and iron(III) nitrate nonahydrate ($Fe(NO_3)_3 \cdot 9H_2O$) such that an atomic ratio of Ir, Ru and Fe became 8:2:1, primarily heat-treating the $SiO2$-added mixture to obtain a primarily heat-treated material, secondly heat-treating the primarily heat-treated material at a temperature of 250° C. under an air atmosphere to obtain a secondly heat-treated material, and removing a portion of $SiO_2$ from the secondly heat-treated material through NaOH.

A second catalyst layer composition was prepared by mixing 65 wt % of the second catalyst with 35 wt % of Nafion (DuPont Company).

A multi-coating layer having a second catalyst layer coated on the first catalyst layer was manufactured by coating the second catalyst layer composition on the FEP film having the first catalyst layer coated thereon and sufficiently drying the second catalyst layer composition coated on the first catalyst layer-coated FEP film at a temperature of 90° C. in the convection oven for 5 hours. At this time, 5 parts by weight of $Ir_8Ru_2FeO_x$ ($0.5 \leq x \leq 2$) was included with respect to 100 parts by weight of the first catalyst.

(Manufacturing a Membrane-Electrode Assembly for a Fuel Cell)

A membrane-catalyst layer assembly was manufactured by transferring a cathode catalyst layer and an anode catalyst layer which are multi-coated with the first catalyst layer and second catalyst layer onto a fluorinated film, and removing the FEP film. Such manufactured catalyst layer was formed in the form as in FIG. 1. A membrane-electrode assembly was manufactured using the manufactured membrane-catalyst layer assembly and a gas diffusion layer (GDL, SGL 35BC).

Example 2

A second catalyst having 42 wt % of $IrRuO_x$ ($0.5 \leq x \leq 2$) and 2 wt % of $SiO_2$ supported on 56 wt % of the stabilization carbon was manufactured by adding 55.6 wt % of $SiO_2$ to 20 wt % of a mixture obtained by mixing chloroiridic acid ($H_2IrCl_8$) with ruthenium trichloride ($RuCl_3$) such that an atomic ratio of Ir and Ru became 1:1 to obtain a $SiO_2$-added mixture, supporting the $SiO_2$-added mixture on 24.4 wt % of a stabilization carbon formed by heat-treating Ketjen black at 2250° C., primarily heat-treating the $SiO_2$-added mixture supported on the stabilization carbon at a temperature of 300° C. under a hydrogen atmosphere to obtain a primarily heat-treated material, secondly heat-treating the primarily heat-treated material at a temperature of 250° C. under an air atmosphere to obtain a secondly heat-treated material, and removing a portion of $SiO_2$ from the secondly heat-treated material through NaOH. At this time, 5 parts by weight of $IrRuO_x$ ($0.5 \leq x \leq 2$) was included with respect to 100 parts by weight of the first catalyst.

A membrane-electrode assembly was manufactured by the same method as in Example 1 except that the above-mentioned second catalyst was used instead of the second catalyst of Example 1.

Example 3

A second catalyst having 42 wt % of $IrRu_2O_x$ (0.5≤x≤2) and 2 wt % of $SiO_2$ supported on 56 wt % of the stabilization carbon was manufactured by adding 55.6 wt % of $SiO_2$ to 20 wt % of a mixture obtained by mixing chloroiridic acid ($H_2IrCl_6$) with ruthenium trichloride ($RuCl_3$) such that an atomic ratio of Ir and Ru became 1:2 to obtain a $SiO_2$-added mixture, supporting the $SiO_2$-added mixture on 24.4 wt % of a stabilization carbon formed by heat-treating Ketjen black at 2250° C., primarily heat-treating the $SiO_2$-added mixture supported on the stabilization carbon at a temperature of 300° C. under a hydrogen atmosphere to obtain a primarily heat-treated material, secondly heat-treating the primarily heat-treated material at a temperature of 250° C. under an air atmosphere to obtain a secondly heat-treated material, and removing a portion of $SiO_2$ from the secondly heat-treated material through NaOH. At this time, 5 parts by weight of $IrRu_2O_x$ (0.5≤x≤2) was included with respect to 100 parts by weight of the first catalyst.

A membrane-electrode assembly was manufactured by the same method as in Example 1 except that the above-mentioned second catalyst was used instead of the second catalyst of Example 1.

Example 4

A second catalyst having 42 wt % of $Ir_2RuO_x$ (0.5≤x≤2) and 2 wt % of $SiO_2$ supported on 56 wt % of the stabilization carbon was manufactured by adding 55.6 wt % of $SiO_2$ to 20 wt % of a mixture obtained by mixing chloroiridic acid ($H_2IrCl_6$) with ruthenium trichloride ($RuCl_3$) such that an atomic ratio of Ir and Ru became 2:1 to obtain a $SiO_2$-added mixture, supporting the $SiO_2$-added mixture on 24.4 wt % of a stabilization carbon formed by heat-treating Ketjen black at 2250° C., primarily heat-treating the $SiO_2$-added mixture supported on the stabilization carbon at a temperature of 300° C. under a hydrogen atmosphere to obtain a primarily heat-treated material, secondly heat-treating the primarily heat-treated material at a temperature of 250° C. under an air atmosphere to obtain a secondly heat-treated material, and removing a portion of $SiO_2$ from the secondly heat-treated material through NaOH. At this time, 5 parts by weight of $Ir_2RuO_x$ (0.5≤x≤2) was included with respect to 100 parts by weight of the first catalyst.

A membrane-electrode assembly was manufactured by the same method as in Example 1 except that the above-mentioned second catalyst was used instead of the second catalyst of Example 1.

Example 5

A second catalyst having 24 wt % of $IrRuO_x$ (0.5≤x≤2) and 2 wt % of $SiO_2$ supported on 74 wt % of the stabilization carbon was manufactured by adding 20 wt % of $SiO_2$ to 20 wt % of a mixture obtained by mixing chloroiridic acid ($H_2IrCl_8$) with ruthenium trichloride ($RuCl_3$) such that an atomic ratio of Ir and Ru became 1:1 to obtain a $SiO_2$-added mixture, supporting the $SiO_2$-added mixture on 60 wt % of a stabilization carbon formed by heat-treating Ketjen black at 2250° C., primarily heat-treating the $SiO_2$-added mixture supported on the stabilization carbon at a temperature of 300° C. under a hydrogen atmosphere to obtain a primarily heat-treated material, secondly heat-treating the primarily heat-treated material at a temperature of 250° C. under an air atmosphere to obtain a secondly heat-treated material, and removing a portion of $SiO_2$ from the secondly heat-treated material through NaOH.

A membrane-electrode assembly was manufactured by the same method as in Example 1 except that the above-mentioned second catalyst was used instead of the second catalyst of Example 1. At this time, 5 parts by weight of $IrRuO_x$ (0.5≤x≤2) was included with respect to 100 parts by weight of the first catalyst.

Example 6

A membrane-electrode assembly was manufactured by the same method as in Example 1 except that 2.5 parts by weight of $Ir_8Ru_2FeO_x$ (0.5≤x≤2) of the second catalyst was included with respect to 100 parts by weight of the first catalyst.

Example 7

A membrane-electrode assembly was manufactured by the same method as in Example 2 except that 2.5 parts by weight of $IrRuO_x$ (0.5≤x≤2) of the second catalyst was included with respect to 100 parts by weight of the first catalyst.

Example 8

A membrane-electrode assembly was manufactured by the same method as in Example 3 except that 2.5 parts by weight of $IrRu_2O_x$ (0.5≤x≤2) of the second catalyst was included with respect to 100 parts by weight of the first catalyst.

Example 9

A membrane-electrode assembly was manufactured by the same method as in Example 4 except that 2.5 parts by weight of $Ir_2RuO_x$ (0.5≤x≤2) of the second catalyst was included with respect to 100 parts by weight of the first catalyst.

Example 10

A membrane-electrode assembly was manufactured by the same method as in Example 5 except that 2.5 parts by weight of $IrRuO_x$ (0.5≤x≤2) of the second catalyst was included with respect to 100 parts by weight of the first catalyst.

Comparative Example 1

A membrane-electrode assembly was manufactured by the same method as in Example 1 except that the second catalyst layer was not used in Example 1.

Comparative Example 2

A membrane-electrode assembly was manufactured by the same method as in Comparative Example 1 by simply mixing $Ir_8Ru_2FeO_x$ (0.5≤x≤2) used in the second catalyst layer in Example 6 in an amount of 2.5 parts by weight with respect to 100 parts by weight of the first catalyst.

Catalyst compositions of Examples 1 to 10 and Comparative Example 1 are shown in the Table 1 below.

TABLE 1

|  |  | Second catalyst | | Weight ratio of first catalyst: second catalyst | IrRuMO$_x$ (* part by weight) |
|---|---|---|---|---|---|
|  |  | Atomic ratio of Ir:Ru:M | Weight ratio of IrRuMO$_x$:SiO$_2$:C | | |
| Example | 1 | 8:2:1 | 94:6:0 | 92.6:7.4 | 5 |
|  | 2 | 1:1:0 | 42:2:56 | 92.6:7.4 | 5 |
|  | 3 | 1:2:0 | 42:2:56 | 92.6:7.4 | 5 |
|  | 4 | 2:1:0 | 42:2:56 | 92.6:7.4 | 5 |
|  | 5 | 1:1:0 | 24:2:74 | 92.6:7.4 | 5 |
|  | 6 | 8:2:1 | 94:6:0 | 96.2:3.8 | 2.5 |
|  | 7 | 1:1:0 | 42:2:56 | 96.2:3.8 | 2.5 |
|  | 8 | 1:2:0 | 42:2:56 | 96.2:3.8 | 2.5 |
|  | 9 | 2:1:0 | 42:2:56 | 96.2:3.8 | 2.5 |
|  | 10 | 1:1:0 | 24:2:74 | 96.2:3.8 | 2.5 |
| Comparative Example | 1 | — | — | 100:0 | — |
|  | 2 | 8:2:1 | 94:6:0 | 96.2:3.8 | 2.5 |

In Table 1, * part by weight is a content unit of IrRuMO$_x$ which is represented based on 100 parts by weight of the first catalyst.

Evaluation 1

A start-up/shut-down experiment was repeatedly performed on the membrane-electrode assemblies (MEA) manufactured according to Comparative Example 1, and Examples 1 and 2.

The repeated start-up/shut-down experiment comprised maintaining temperature of unit battery cells to 65° C. while flowing 200 CCM of N$_2$ with a relative humidity of 100% to a cathode electrode of the MEA and 100 CCM of H$_2$ with a relative humidity of 100% to an anode electrode of the MEA, and performing an experimental process of repeating start-up/shut-down to a voltage range of 1.0 to 1.5 V at a rate of 500 mV/s. The repeated start-up/shut-down experiment further comprised measuring current-voltage performance in every 1000 cycles, and performing an electrochemical analysis process. Results of performing the repeated start-up/shut-down experiment are shown in FIG. 5.

Figure 5:
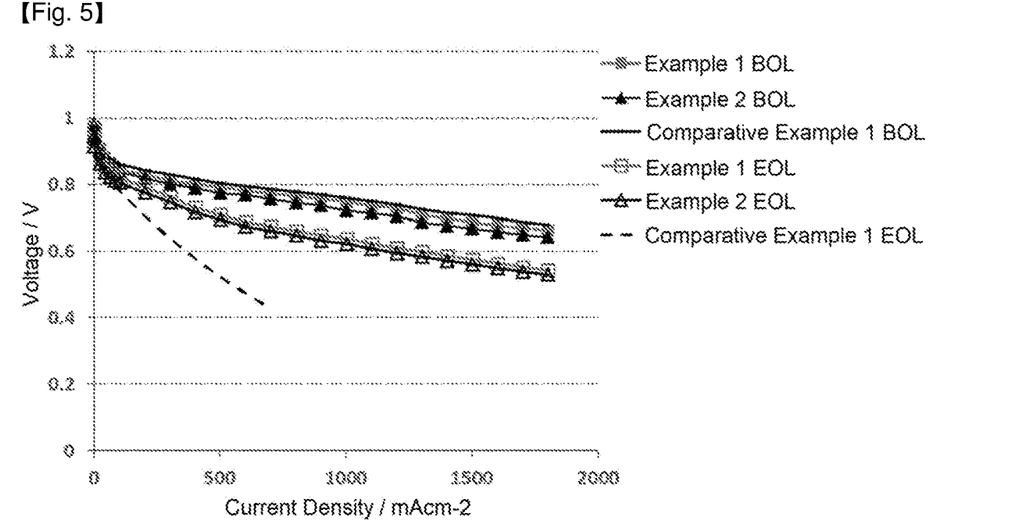
FIG. 5 is a graph showing current densities according to the progress of start-up/shut-down cycles of membrane-electrode assemblies manufactured in Comparative Example 1, Example 1 and Example 2.

FIG. 5 is a graph showing current densities according to the progress of start-up/shut-down cycles of the membrane-electrode assemblies manufactured in Comparative Example 1, Example 1 and Example 2.

Referring to FIG. 5, it can be seen that battery durability performances before and after performing the repeated start-up/shut-down experiment are very excellent in Example using the second catalyst layer according to an embodiment compared to Comparative Example 1.

In order to evaluate oxygen evolution reaction (OER) activities of the catalyst layers manufactured in Comparative Example 1 and Example 6, temperature of unit battery cells was maintained to 65° C., N$_2$ with a relative humidity of 100% was supplied to the cathode electrode, H$_2$ with a relative humidity of 100% was supplied to the anode electrode, and cyclic voltammetry (CV) was performed. The voltage scanning range was expanded up to a water decomposition occurring region by maintaining a voltage scanning range of 0 to 1.5 V. The results are shown in FIG. 6 and FIG. 7.

Figure 6:
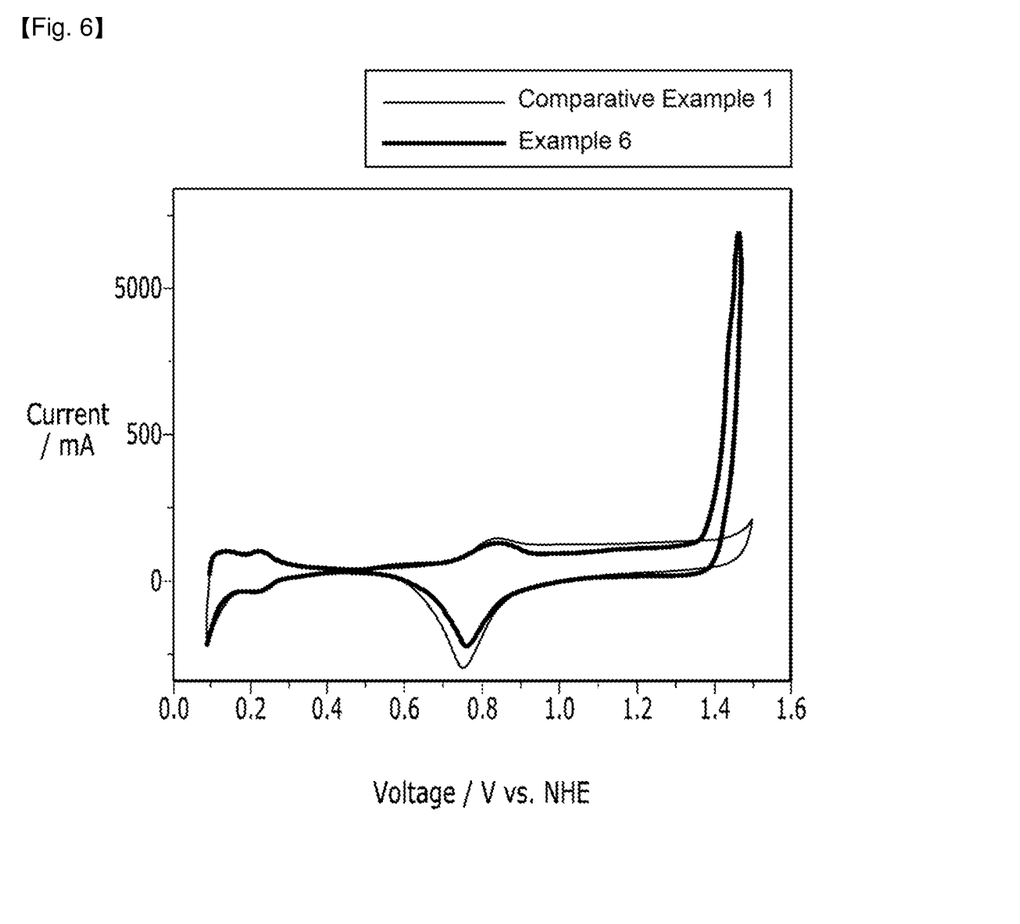
FIG. 6 shows a cyclic voltammetry graph of catalyst layers of Comparative Example 1 and Example 6.
Figure 7:
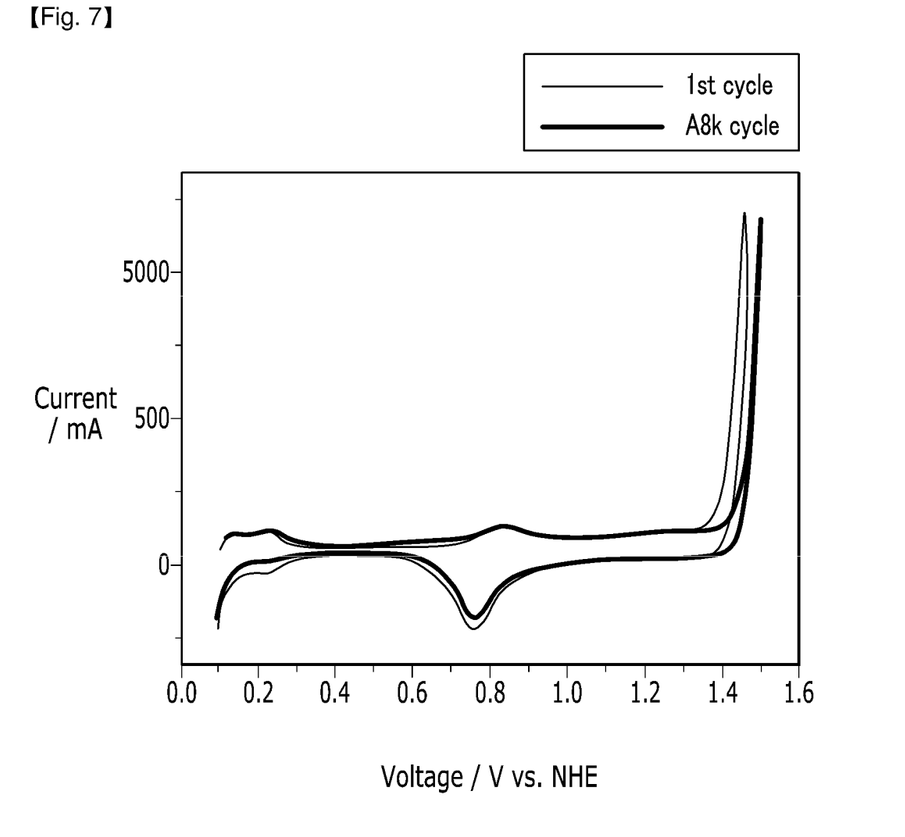
FIG. 7 shows a cyclic voltammetry graph according to the number of start-up/shut-down cycles of the catalyst layer of Example 6.

FIG. 6 shows a cyclic voltammetry graph of the catalyst layers of Comparative Example 1 and Example 6, and FIG. 7 shows a cyclic voltammetry graph according to the number of start-up/shut-down cycles of the catalyst layer of Example 6.

Referring to FIG. 6, it can be seen that current is rapidly increased near 1.4 V in case of Example 6. From this, it can be seen that an oxygen generating reaction of decomposing water to generate oxygen occurs, and it can be seen accordingly that stability of the fuel cell catalyst can be increased by decomposing water prior to corrosion of carbon when a catalyst of a fuel cell according to an embodiment includes a second catalyst layer.

Further, it can be seen referring to FIG. 7 that activities of a water decomposing catalyst are highly maintained even at 8,000 start-up/shut-down cycles in case of Example 6.

Evaluation 3

After measuring voltage loss values at a current density of 500 mA/cm$^{-2}$ with respect to the membrane-electrode assemblies (MEA) manufactured according to Comparative Example 1 and Examples 1 to 5, the measured voltage loss values are represented in Table 2 below.

TABLE 2

| | Voltage loss value (mV) at 500 mA/cm$^{-2}$ |
|---|---|
| Example 1 | 52 |
| Example 2 | 53 |
| Example 3 | 54 |
| Example 4 | 55 |
| Example 5 | 56 |
| Comparative Example 1 | 272 |

Referring to Table 2, voltage loss values of the membrane-electrode assemblies manufactured according to Examples 1 to 5 were lower than a voltage loss value of the membrane-electrode assembly manufactured according to Comparative Example 1. Therefore, it can be seen that durability values of the membrane-electrode assemblies manufactured by Examples 1 to 5 were improved than a durability value of the membrane-electrode assembly manufactured by Comparative Example 1.

Evaluation 4

Support durability values were evaluated on the membrane-electrode assemblies manufactured according to Examples 6 to 10 and Comparative Examples 1 and 2.

After evaluating the support durability values by conditions of Table 3 below, evaluation results are represented in Table 4 below.

TABLE 3

| Catalyst support cycle and measurement items | |
|---|---|
| Cycle | Triangle sweep cycle: 500 mV/s between 1.0 V and 1.5 V; implementation of polarization curve and ECSA; repetition for the total 400 hours using a single cell with 25 to 50 cm$^2$ |
| Cycle number | 5000 cycles |
| Temperature | 80° C. |
| Relative humidity | Cathode/anode 100/100% |
| Fuel/oxidizer | Hydrogen/nitrogen |
| Pressure | Atmospheric pressure |
| Measurement item | Target |
| Catalyst activity | 40% or more loss in initial catalyst activity |
| Polarization curve from 0 to 1.5 A/cm$^2$ or more | 30 mV or more loss at a rated power of 1.5 A/cm$^2$ |
| ECSA/ cyclic voltammetry (CV) | 40% or more loss in the initial region |

TABLE 4

| | Voltage loss value (mV) at 1.5 A/cm² after 5,000 cycles |
|---|---|
| Example 6 | 28 mV |
| Example 7 | 45 mV |
| Example 8 | 47 mV |
| Example 9 | 54 mV |
| Example 10 | 58 mV |
| Comparative Example 1 | 65 mV |
| Comparative Example 2 | 143 mV |

It could be confirmed that the voltage loss values of Examples 6 to 10 are remarkably low when comparing voltage loss values of Examples 6 to 10 having the second catalyst layer including the oxygen evolution reaction (OER) catalyst positioned between the electrolyte membrane and the first catalyst layer with voltage loss values of Comparative Example 1 including only a single catalyst layer which does not include an oxygen generating reaction catalyst and Comparative Example 2 including only a single catalyst layer having the oxygen generating reaction catalyst simply mixed therein.

These results are expected to be so since it is generally known that a large quantity of water is produced by the electrochemical reaction in the interface at which the polymer electrolyte membrane and the catalyst layer meet such that durability of the support of the membrane-electrode assembly (MEA) for the fuel cell can be improved, and output performance of the membrane-electrode assembly can be improved accordingly by positioning the second catalyst layer including the OER catalyst between the electrolyte membrane and the first catalyst layer, thereby inhibiting a corrosion phenomenon of a carbon support through acceleration of the water decomposition reaction.

INDUSTRIAL APPLICABILITY

The membrane-electrode assembly for the fuel cell of the present invention can prevent corrosion of the support and has excellent activities and stability in the low current region by including the second catalyst layer including a reaction inducing material between the first catalyst layer and the polymer electrolyte membrane, the reaction inducing material being a metal or alloy selected from Ir, Ru, $Ir_aRu_b$, $Ir_cRu_dM_e$, $Ir_fM_g$, $Ru_jM_g$, and a combination thereof, or an oxide selected from $IrO_x$, $RuO_x$, $Ir_aRu_bO_x$, $Ir_cRu_dM_eO_x$, $Ir_fM_gO_x$, $Ru_jM_gO_x$, and a combination thereof.

The invention claimed is:

1. A membrane-electrode assembly for a fuel cell comprising:
    a cathode electrode and an anode electrode which are positioned oppositely to each other; and
    a polymer electrolyte membrane which is positioned between the cathode electrode and the anode electrode, the cathode electrode and the anode electrode each including:
    an electrode substrate;
    a micropore layer which is positioned on the electrode substrate; and
    a first catalyst layer which is positioned on the micropore layer,
    the cathode electrode, the anode electrode, or both thereof further including a second catalyst layer being positioned between the first catalyst layer and the polymer electrolyte membrane,
    wherein the second catalyst layer includes a reaction inducing material, and
    wherein the reaction inducing material is $Ir_8Ru_2FeO_x$, wherein x is an integer of 0.5 to 2.

2. The membrane-electrode assembly for the fuel cell of claim 1, wherein the second catalyst layer has a thickness of 0.1 to 5 μm.

3. The membrane-electrode assembly for the fuel cell of claim 1, wherein the second catalyst layer further includes a support which supports the reaction inducing material.

4. The membrane-electrode assembly for the fuel cell of claim 3, wherein the reaction inducing material is included in an amount of 20 to 99 wt % with respect to a total amount of the reaction inducing material and the support.

5. The membrane-electrode assembly for the fuel cell of claim 3, wherein the support includes graphite, Denka black, Ketjen black, acetylene black, carbon nanotube, carbon nanofiber, carbon nanowire, carbon nanoball, activated carbon, stabilized carbon, indium tin oxide (ITO), or a combination thereof.

6. The membrane-electrode assembly for the fuel cell of claim 1, wherein the second catalyst layer further includes an additive selected from the group consisting of $SiO_2$, $TiO_2$, $WO_x$, and $ZrO_2$, wherein x is an integer of 0.5 to 2.

7. The membrane-electrode assembly for the fuel cell of claim 6, wherein the second catalyst layer further includes a support which supports the reaction inducing material and the additive.

8. The membrane-electrode assembly for the fuel cell of claim 7, wherein the reaction inducing material and the additive are included in a total content of 20 to 99 wt % with respect to a total amount of the reaction inducing material, the additive, and the support.

9. The membrane-electrode assembly for the fuel cell of claim 7, wherein the additive is included in an amount of 0.5 to 5 wt % with respect to a total amount of the reaction inducing material, the additive, and the support.

10. The membrane-electrode assembly for the fuel cell of claim 7, wherein the support includes graphite, Denka black, Ketjen black, acetylene black, carbon nanotube, carbon nanofiber, carbon nanowire, carbon nanoball, activated carbon, stabilized carbon, indium tin oxide (ITO), or a combination thereof.

* * * * *